United States Patent
Bodensiek et al.

(10) Patent No.: US 11,942,844 B2
(45) Date of Patent: Mar. 26, 2024

(54) TOOTH-WOUND COIL AND METHOD FOR PRODUCING A TOOTH-WOUND COIL

(71) Applicant: Flender GmbH, Bocholt (DE)

(72) Inventors: Kevin Bodensiek, Röthenbach an der Pegnitz (DE); Robin Brenner, Kirchham (DE); Klaus Schäfer, Nuremberg (DE); Norbert Schönbauer, Bad Füssing (DE); Michael Weger, Kösslarn (DE)

(73) Assignee: Flender GmbH, Bocholt (DE)

( * ) Notice: Subject to any disclaimer, the term of this patent is extended or adjusted under 35 U.S.C. 154(b) by 470 days.

(21) Appl. No.: 17/274,088

(22) PCT Filed: Aug. 29, 2019

(86) PCT No.: PCT/EP2019/073083
§ 371 (c)(1),
(2) Date: Mar. 5, 2021

(87) PCT Pub. No.: WO2020/048864
PCT Pub. Date: Mar. 12, 2020

(65) Prior Publication Data
US 2021/0336503 A1 Oct. 28, 2021

(30) Foreign Application Priority Data
Sep. 6, 2018 (EP) .................... 18192909

(51) Int. Cl.
*H02K 3/32* (2006.01)
*F03D 9/25* (2016.01)
(Continued)

(52) U.S. Cl.
CPC ............ *H02K 3/325* (2013.01); *F03D 9/255* (2017.02); *H02K 3/40* (2013.01); *H02K 3/487* (2013.01);
(Continued)

(58) Field of Classification Search
CPC .......... H02K 3/325; H02K 3/40; H02K 3/487; H02K 3/522; H02K 7/183; H02K 15/0018;
(Continued)

(56) References Cited

U.S. PATENT DOCUMENTS

2003/0127933 A1* 7/2003 Enomoto ............. H02K 15/022
310/194
2005/0057113 A1 3/2005 Du et al.
(Continued)

FOREIGN PATENT DOCUMENTS

EP  1 947 755 B1  7/2008
EP  2 854 256 A1  4/2015
(Continued)

OTHER PUBLICATIONS

PCT International Search Report and Written Opinion of International Searching Authority dated Dec. 5, 2019 corresponding to PCT International Application No. PCT/EP2019/073083 filed Aug. 29, 2019.

*Primary Examiner* — Thomas Truong
(74) *Attorney, Agent, or Firm* — Henry M. Feiereisen LLC

(57) ABSTRACT

A tooth-wound coil of a stator or of a stator segment of a dynamo-electric machine having two straight sections spaced apart from each other and running substantially parallel. Two 180° curves are located on the ends thereof, wherein the straight sections have an active part area, the axial extend of which is less than or equal to that of the straight section. The tooth-wound coil has a symmetrical extension plane running in the longitudinal direction. An insulation material is provided around the straight sections of the tooth-wound coil. The material effects groove isolation and/or phase isolation in the stator or stator segment.

13 Claims, 3 Drawing Sheets

(51) Int. Cl.
*H02K 3/40* (2006.01)
*H02K 3/487* (2006.01)
*H02K 3/52* (2006.01)
*H02K 7/18* (2006.01)
*H02K 15/00* (2006.01)
*H02K 15/10* (2006.01)
*F03D 1/00* (2006.01)

(52) U.S. Cl.
CPC ............ *H02K 3/522* (2013.01); *H02K 7/183* (2013.01); *H02K 15/0018* (2013.01); *H02K 15/0043* (2013.01); *H02K 15/105* (2013.01); *F03D 1/00* (2013.01)

(58) Field of Classification Search
CPC .... H02K 15/0043; H02K 15/105; H02K 3/34; H02K 3/345; F03D 9/255; F03D 1/00; Y02E 10/72
See application file for complete search history.

(56) References Cited

U.S. PATENT DOCUMENTS

| | | | |
|---|---|---|---|
| 2014/0353000 A1* | 12/2014 | Yin | H01B 3/04 156/185 |
| 2015/0084454 A1 | 3/2015 | Noer | |
| 2015/0214804 A1 | 7/2015 | Katsuragi et al. | |
| 2015/0256052 A1* | 9/2015 | Yoshida | H02K 15/0081 29/598 |
| 2015/0263578 A1 | 9/2015 | Hayslett et al. | |
| 2017/0047803 A1 | 2/2017 | Scherer et al. | |
| 2017/0179776 A1* | 6/2017 | Hartmann | H02K 1/148 |
| 2018/0175705 A1* | 6/2018 | Festa | H02K 3/24 |

FOREIGN PATENT DOCUMENTS

| | | |
|---|---|---|
| EP | 2 933 901 A1 | 10/2015 |
| EP | 3 176 915 A1 | 6/2017 |
| JP | 2010 141963 A | 6/2010 |
| JP | 6 072199 B1 | 2/2017 |

* cited by examiner

TOOTH-WOUND COIL AND METHOD FOR PRODUCING A TOOTH-WOUND COIL

CROSS-REFERENCES TO RELATED APPLICATIONS

This application is the U.S. National Stage of International Application No. PCT/EP2019/073083, filed Aug. 29, 2019, which designated the United States and has been published as International Publication No. WO 2020/048864 A1 and which claims the priority of European Patent Application, Serial No. 18192909.2, filed Sep. 6, 2018, pursuant to 35 U.S.C. 119(x) (d).

BACKGROUND OF THE INVENTION

The invention relates to a tooth-wound coil, and also to the method for producing a tooth-wound coil, similarly to a stator or a stator segment with an inventive tooth-wound coil, and also to a wind power generator which has inventive tooth-wound coils.

With dynamoelectric machines, be it motors or generators with tooth-wound coil windings, one embodiment is that two coil sides of different coils and/or different electric phases are disposed in a groove. These must then be insulated from one another by means of a suitable phase insulation, for instance. At the same time, these coil sides must also be insulated from ground, in other words the groove wall. These additional insulation means have a negative effect on the filling factor of the conductor material in the groove. As a result, the performance of the generator or the motor is reduced.

EP 1 947 755 B1 discloses a stator of an electric machine, which provides separators in the grooves.

The disadvantage here is that the groove filling factor is comparatively low.

On that basis the object underlying the invention is to create a tooth-wound coil or a stator or a stator segment of a dynamoelectric machine, in particular a wind power generator, which allows a comparatively high filling factor of the groove while optimizing the insulation material. Moreover, the axial winding head projections of the tooth-wound coil should be reduced. Furthermore, the production method of a tooth-wound coil or a stator or a stator segment of a dynamoelectric machine, in particular of a wind power generator, should be comparatively simple.

SUMMARY OF THE INVENTION

The set object is achieved by a tooth-wound coil of a stator or stator segment of a dynamoelectric machine with
two straight sections spaced apart from each other and running substantially parallel, and two in particular 180° curves located on the ends thereof, wherein the straight sections have an active part area, the axial extent of which is smaller than or equal to that of the straight section,
wherein the tooth-wound coil has a symmetrical extension plane running in the longitudinal direction,
wherein an insulation material is provided around the straight sections of the tooth-wound coil, which material effects groove insulation and/or phase insulation in the stator or stator segment.

The solution is likewise achieved by a stator or stator segment of a dynamoelectric machine, which have a magnetically conductive base body, in which at least partially opened grooves which run substantially axially are provided, which are provided with inventive tooth-wound coils, wherein one or two coil sides are arranged per groove of the stator or stator segment.

The set object is likewise achieved by a wind power generator with an inventive stator or a stator segment, wherein the stator or the stator segment is part of an external rotor or internal rotor generator.

The set object is likewise achieved by a wind power plant with at least one inventive wind power generator.

The set object is likewise achieved by a method for producing an inventive tooth-wound coil by means of the following steps:
winding conductor material onto an auxiliary body,
removing the prefabricated tooth-wound coil from the auxiliary body and winding the tooth-wound coil, at least onto the active part areas thereof with an insulation material.

The set object is likewise achieved by a method for producing an inventive stator or stator segment by means of the following steps:
providing a magnetically conductive base body, in particular a laminated core with a series of grooves and teeth, wherein tooth-wound coils are positioned in the grooves, so that one coil side or two coil sides of different tooth-wound coils are present per groove.

In accordance with the invention, a tooth-wound coil is now provided with a combined groove and phase insulation. A prefabricated tooth-wound coil is therefore now provided with insulation material prior to positioning in a groove of the magnetically conductive base body, in other words, a laminated core, for instance. The insulation is both an insulation from the groove wall and also, if present, from an adjacent coil side of another tooth-wound coil in this groove.

Here the insulation material is preferably a laminate composed of PET fleece, PET film and mica. In order to achieve a higher insulation material class, other insulation materials can also be used here. These are the afore-cited materials, for instance, in which here the PET proportions are replaced by PI or PEEK.

The abbreviations used here are:
PET (polyethylene terephthalate) is a thermoplastic plastic from the polyester family which is produced by polycondensation.
PI (polyimide) are plastics with the structural features of an imide group.
PEEK (polyether ether ketone) is a high temperature-resistant thermoplastic plastic and belongs to the polyaryletherketone materials group. Its melting temperature amounts to 335° C. and is therefore suited to the insulation requirement at higher temperatures.

Calendered muscovite mica is preferably used as mica.

The layer thickness of the phase insulation preferably corresponds to approx. twice the layer thickness of the groove insulation with respect to the groove wall. These layer thicknesses also depend on the stress load of the dynamoelectric machine.

The tooth-wound coil is now positioned approximately centrally above the tooth of the laminated core when the stator or the stator segment is assembled only from the (subsequent) air gap side of the dynamoelectric machine. Depending on the embodiment of the stator or of the stator segment, a widening of the tooth-wound cool by a special tool is necessary here to ensure that the limb or the straight sections of the tooth-wound coil can be positioned in the grooves. The insulation material must naturally "cooperate with" the widening or pulling or compressing of the tooth-wound coil.

The filling factor of the groove is now advantageously higher, and the insulation parts of a tooth-wound coil in the groove are likewise reduced to the necessary degree, similarly a sustained positioning of the groove insulation on the tooth-wound cool is achieved. An additional fixing of the tooth-wound coil in the groove—if necessary—is produced by a groove closure element.

Furthermore, as a result the axial projection of the winding head of the winding system of the stator is comparatively short, which makes the use of an inventive tooth-wound coil in a stator or a stator segment of a dynamoelectric machine, in particular of a wind power plant with restricted space available, particularly attractive.

BRIEF DESCRIPTION OF THE DRAWING

The invention and further advantageous embodiments of the invention are explained in more detail on the basis of exemplary embodiments shown by way of example; in the figures.

DETAILED DESCRIPTION OF PREFERRED EMBODIMENTS

Figure 1:
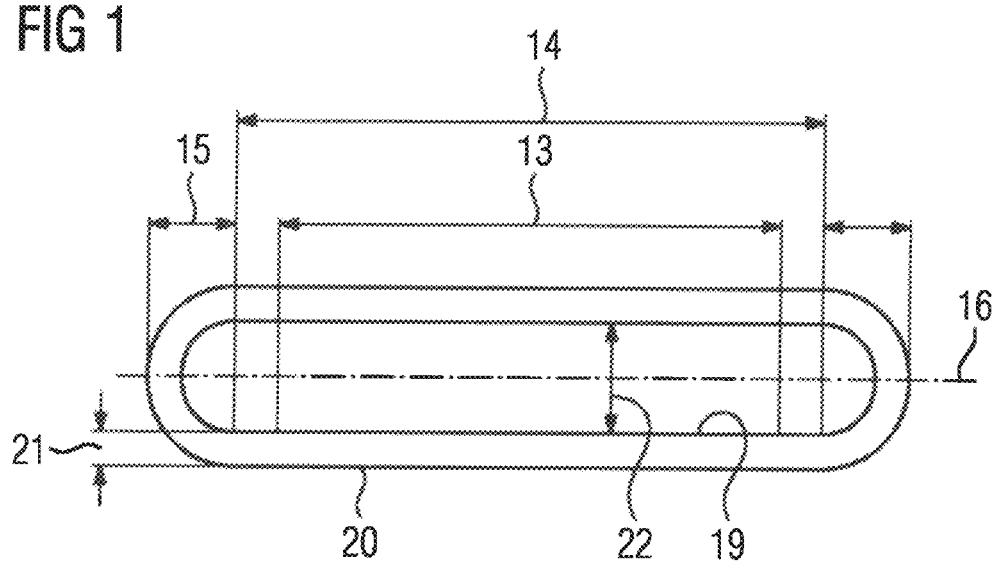
FIG. 1 shows a view of a tooth-wound coil.

FIG. 1 shows a tooth-wound coil 6 without insulation 9, with its straight sections 14 and the in particular 180° curves, the curved areas 15. The tooth-wound coil 6 is symmetrical to an extension plane 16, which is at right angles to the drawing plane. The straight sections 14 have an active part area 13, which, in this case, is smaller than the straight section 14.

The active part area 13 is the minimal area of the tooth-wound coil 6, which is arranged in a laminated core of a stator 3 or stator segment 25. The straight section 14 is the area which is possibly additionally still to be provided with an insulation 9, in order, inter alia, to maintain the creepage distance requirements of the tooth-wound coil 6 in the stator 3.

The straight sections 14 of the tooth-wound coil 6 have a distance 22 from their interior sides 19 which ideally corresponds to a tooth width of a stator 3 or stator segment 25. The conductor thickness 21 of the tooth-wound coil 6 occupies at least part of the width of a groove 17 of the stator 3 or the stator segment 25. The insulation is used for potential separation with respect to the groove wall 27 on the interior side 19 of the tooth-wound coil 6.

Insulations 9 on the exterior sides 20 of the straight sections 14 of the tooth-wound coil 6 are used for phase insulation with respect to an adjacent coil side of an adjacent tooth-wound coil 6 in the groove 17 and project axially into the area of the winding heads 18 which are formed by the curved areas 15.

Figure 2:
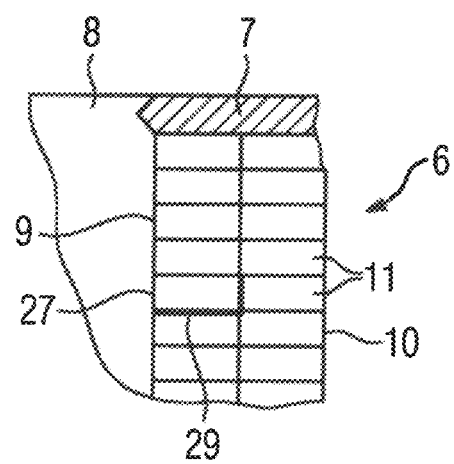
FIG. 2 shows a partial view of a tooth-wound coil.

FIG. 2 shows a lateral representation of a basic arrangement of a tooth-wound coil 6, wherein the individual sub-conductors 11 are embodied as a two-layer flat wire 10 and have a sub-conductor insulation 29 with respect to the adjacent sub-conductors 11. This sub-conductor insulation 29 extends across the entire length of the tooth-wound coil 6, in other words the length of the curved areas 15 plus the straight sections 14 of the tooth-wound coil 6. Viewed in the peripheral direction, this sub-conductor insulation 29 of a sub-conductor 11 extends across at least two sides, a longitudinal side and a transverse side, such as, for graphical reasons, is shown in principle over-dimensioned on a sub-conductor 11. The groove 17 itself is closed by a groove closure element 7 with respect to an air gap 23 of a dynamoelectric machine.

Figure 3:
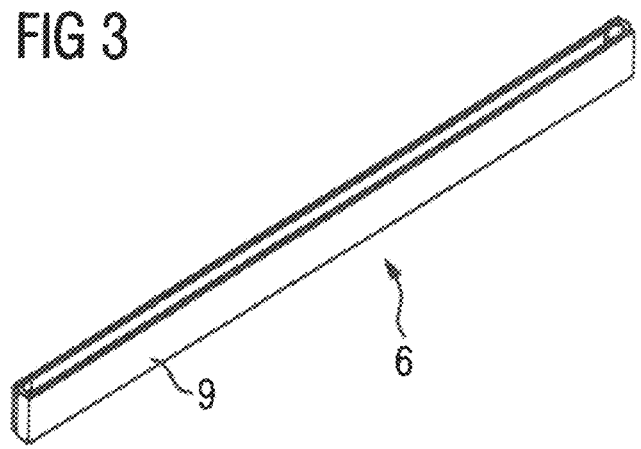
FIG. 3 shows a perspective representation of a prefabricated tooth-wound coil.

FIG. 3 shows a prefabricated tooth-wound coil 6 with its insulations 9, which can also contain mica, in order inter alia to avoid partial discharges. This preferably involves calendered muscovite mica impregnated with a fully cured impregnation resin.

Figure 4:
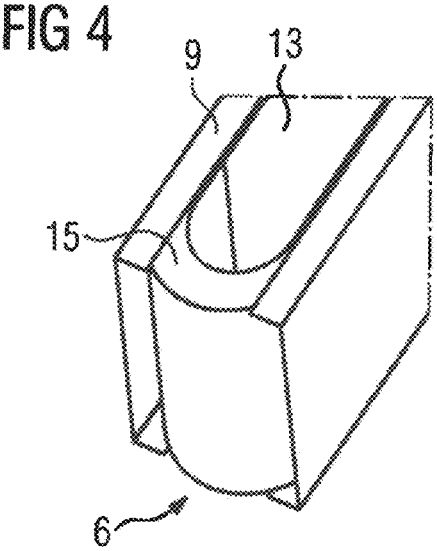
FIG. 4 shows a partial cutout of a tooth-wound coil.

FIG. 4 shows the arrangement in the area of the winding head 18, wherein the exterior sides 20 of the tooth-wound coil 6 are provided with insulation material which is embodied to be axially longer in the direction of the winding head 18 than in respect of the interior skies 19. This is inter aha due to the fact that the curved areas 15 connect thereto. Furthermore, an improved leakage current stability is reached in this area as a result.

Figure 5:
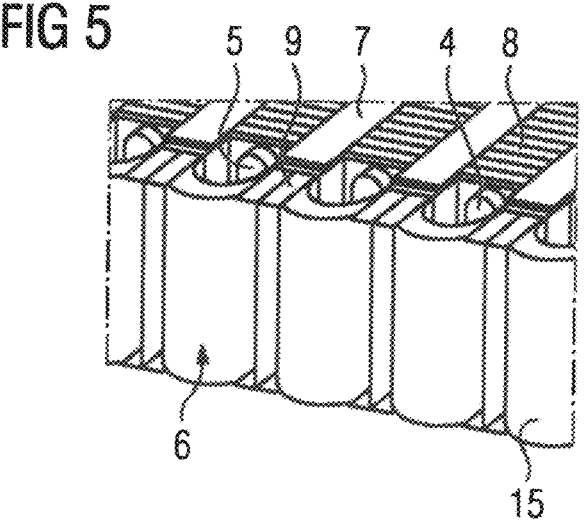
FIG. 5 shows a partial view of an arrangement of tooth-wound coils in a laminated core.

FIG. 5 now shows an arrangement of insulated, prefabricated tooth-wound coil 6 in the grooves 17 of a stator 3 or stator segment 25. Here the stator 3 or the stator segment 25 is axially packaged by pressure plates 4 and/or fingers 5 of a pressure plate 4. Prefabricated tooth-wound coils 6 are arranged in grooves 17 of this laminated core of the stator 3 or of the stator segment 25. In this embodiment, straight sections 14 or active part areas 13 of different tooth-wound coils 6 are arranged per groove 17.

The area of the winding head 16 of the stator 3 or stator segment 25 is now composed of 180° curves, in other words the curved areas 15 of the most varied of tooth-wound coils 6. The insulation 9 on the exterior sides 20 of the tooth-wound coils 6 extends axially at least as far as the curved area 15 or therebeyond. The insulation 9 on the exterior sides 20 of the tooth-wound coils 6 therefore extends as far as or virtually onto the axial height of the axial projection of the winding heads 18.

Figure 6:
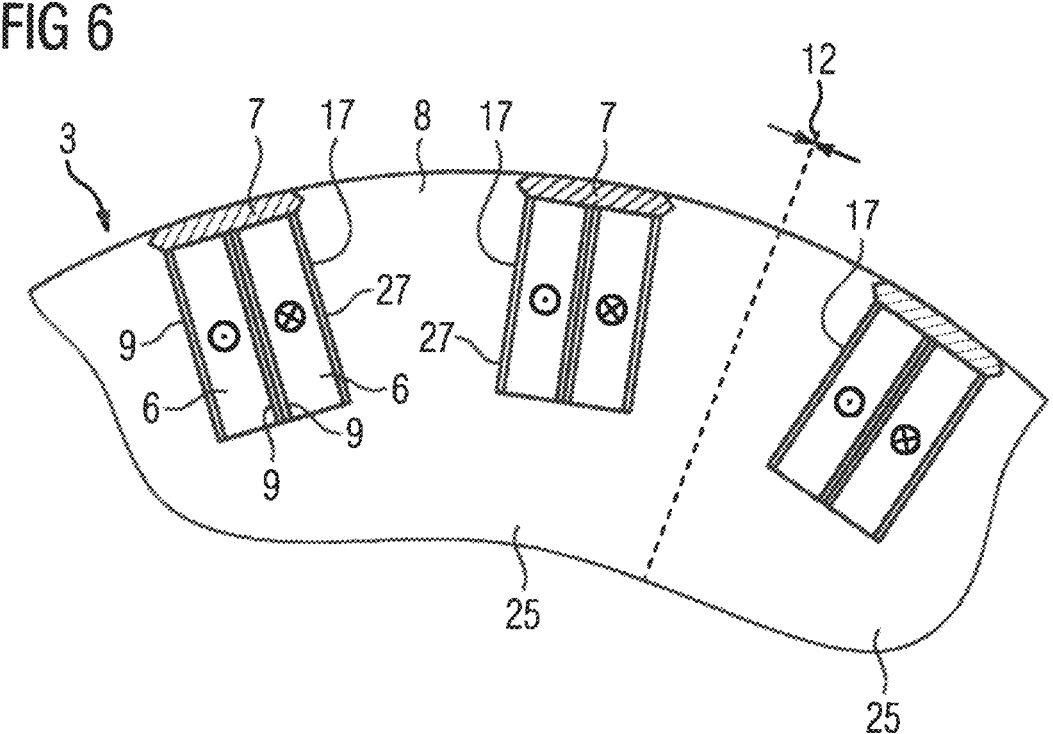
FIG. 6 shows a side view of a stator segment.

FIG. 6 shows a lateral partial view of a stator segment 25 with an optional segment limit 12 of the stator segment 26, wherein two coil sides of different tooth-wound coils 6, possibly also of different electric phases, are arranged in the grooves 17 in each case. Accordingly, an insulation 9 is to be provided there between the exterior sides 20 of the tooth-wound coils 6 and also between the tooth-wound cons 6 and the teeth 8 of the stator segment 25, Groove closure elements 7 are located in the area of the tooth 8 which is facing an air gap 23.

Viewed cross-sectionally, a tooth-wound coil 6 has at least to some extent coil sides arranged in a V shape. The coil sides which are inclined with respect to one another are possibly required to follow an above all comparatively minimal curvature radius of the stator 3 or stator segment 25 which is facing an air gap 23 and thus a rotor 24.

Figure 7:
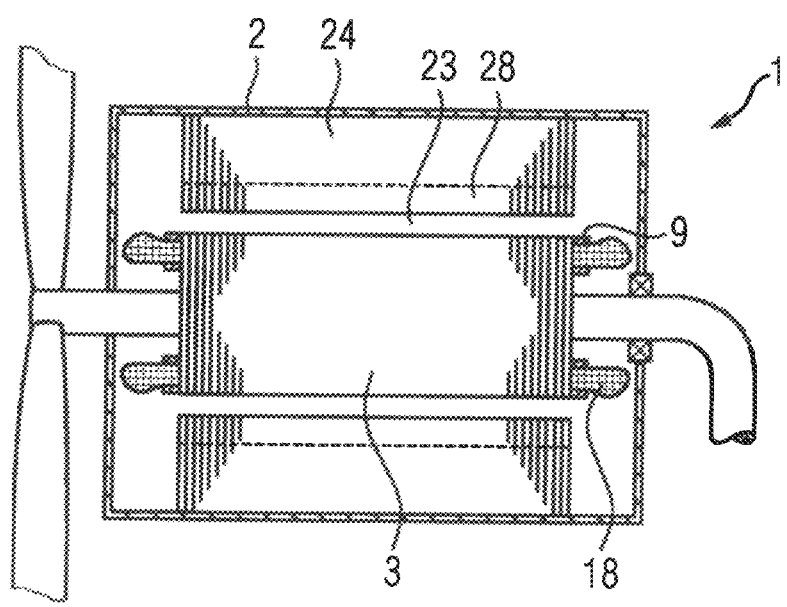
FIG. 7 shows an arrangement of a generator in a wind power plant.

FIG. 7 shows a basic representation of a wind power plant 1 having an external rotor generator 2, the rotor 24 of which is driven directly by a wind turbine, wherein electrical energy is generated by means of electromagnetic interaction between the rotor 24, which is provided with permanent magnets 28, and an inventively assembled stator 3 or stator segments 25 by means of electromagnetic interaction. Here the rotor 24 rotates with its housing which is fastened to a shaft of the wind turbine around the stationary stator 3.

The invention claimed is:

1. A wind power generator, comprising a stator or a stator segment being part of an external rotor or internal rotor generator and comprising a magnetically conductive base body provided with substantially axially running, at least partially opened grooves, tooth-wound coils woqgd_frorm a flat wire and received in the grooves, with one or two coil sides being arranged per groove of the stator or stator segment, each said tooth-wound coil comprising:
    two straight sections spaced apart from one another and running substantially parallel, said straight sections having an active part area defined by an axial extent which is less than or equal to an axial extent of the straight sections,
    two curves located on ends of the sections, respectively and forming a winding head, said tooth-wound coil having a symmetrical extension plane which runs in a longitudinal direction, and
    an insulation material provided around the straight sections of the tooth-wound coil and effecting a groove and/or phase insulation in the stator or stator segment, said insulation material being configured axially longer in a direction of the winding head on exterior sides of the tooth-wound coil with respect to interior sides of the tooth-wound coil,
    wherein the flat wire forms sub-conductors having a sub-conductor insulation, which viewed in a peripheral direction, extends across at least two sides a longitudinal side and a transverse side such that adjacent sub-conductors are separated by at most a sip fie sub-conductor insulation.

2. The wind power generator of claim 1, wherein the curves are 180° curves.

3. The wind power generator of claim 1, wherein the flat wire is arranged on edge with respect to the extension plane so that when viewed in cross-section, a longitudinal extent of the flat wire is at a right angle to the extension plane.

4. The wind power generator of claim 1, wherein the insulation material of the tooth-wound coil is provided at least on the active part area of the straight sections.

5. The wind power generator of the claim 1, wherein the insulation material includes mica so as to be partial discharge-resistant.

6. The wind power generator of claim 1, wherein the grooves have each an opening, and further comprising a groove closure element configured to close the groove.

7. The wind power generator of claim 1, wherein the insulation material is a self-adhesive insulation material to effect the groove and/or phase insulation.

8. The wind power generator of claim 7, wherein the self-adhesive insulation material is paper.

9. A wind power plant, comprising a wind power generator, said wind generator comprising a stator or a stator segment being part of an external rotor or internal rotor generator and comprising a magnetically conductive base body provided with substantially axially running, at least partially opened grooves, tooth-wound coils wound from a flat wire and received in the grooves, with one or two coil sides being arranged per groove of the stator or stator segment, each said tooth-wound coil comprising two straight sections spaced apart from one another and running substantially parallel, said straight sections having an active part area defined by an axial extent which is less than or equal to an axial extent of the straight sections, two curves located on ends of the sections, respectively and forming a winding head, said tooth-wound coil having a symmetrical extension plane which runs in a longitudinal direction, and an insulation material provided around the straight sections of the tooth-wound coil and effecting a groove and/or phase insulation in the stator or stator segment, said insulation material being configured axially longer in a direction of the winding head on exterior sides of the tooth-wound coil with respect to interior sides of the tooth-wound coil,
    wherein the flat wire forms sub conductors having a sub-conductor insulation, which viewed in a peripheral direction, extends across at least two sides a longitudinal side and a transverse side such that adjacent sub-conductors are separated by at most a simile sub-conductor insulation.

10. A method for producing the tooth-wound coil of the stator or stator segment of a wind power generator, said method comprising:
    winding a conductor material formed from a flat wire forming sub-conductors having; a sub-conductor insulation, which, viewed in a peripheral direction, extends across at least two, sides, a longitudinal side and a transverse side, in one or two layers onto an auxiliary body to produce a prefabricated tooth-wound coil, such that adjacent sub-conductors are separated by at most a single sub-conductor insulation; and
    removing from the auxiliary body the prefabricated tooth-wound coil having two axial straight sections in substantially parallel spaced apart relation and two curves located on ends of the straight sections, respectively, to form a winding head; and
    winding insulation material on an active part area of the straight sections such that the insulation material on exterior sides of the tooth-wound coil is configured axially longer in a direction of the winding head with respect to interior sides of the tooth-wound coil.

11. The method of claim 10, further comprising:
    providing a magnetically conductive base body with a series of grooves and teeth; and
    positioning tooth-wound cons in the series of grooves so that per groove, one coil side or two coil sides of different tooth-wound coils are present.

12. The method of claim 11, wherein the base body is a laminated core.

13. The method of claim 11, further comprising closing an air-gap-facing opening of each of the grooves with a groove closure element.

* * * * *

UNITED STATES PATENT AND TRADEMARK OFFICE
CERTIFICATE OF CORRECTION

| | |
|---|---|
| PATENT NO. | : 11,942,844 B2 |
| APPLICATION NO. | : 17/274088 |
| DATED | : March 26, 2024 |
| INVENTOR(S) | : Kevin Bodensiek et al. |

It is certified that error appears in the above-identified patent and that said Letters Patent is hereby corrected as shown below:

In the Claims

In Column 5, Claim 1, Line 6: replace "wopgd_frorm" with --wound from--;
In Column 5, Claim 1, Line 30: replace "sip fie" with --single--;
In Column 6, Claim 9, Line 20: after "two sides" add --,--;
In Column 6, Claim 9, Line 21: after "transverse side" add --,--;
In Column 6, Claim 9, Line 22: replace "simile" with --single--;
In Column 6, Claim 10, Line 30: remove "," after "two".

Signed and Sealed this
Fourteenth Day of May, 2024

Katherine Kelly Vidal
*Director of the United States Patent and Trademark Office*